US006768102B1

(12) United States Patent
Skoll (10) Patent No.: US 6,768,102 B1
(45) Date of Patent: Jul. 27, 2004

(54) METHOD AND SYSTEM FOR RECALIBRATION DURING MICRO-IMAGING TO DETERMINE THERMAL DRIFT

(75) Inventor: David F. Skoll, Ottawa (CA)

(73) Assignee: Chipworks, Ottawa (CA)

( * ) Notice: Subject to any disclaimer, the term of this patent is extended or adjusted under 35 U.S.C. 154(b) by 791 days.

(21) Appl. No.: 09/594,169

(22) Filed: Jun. 15, 2000

(51) Int. Cl.[7] ......................... G01D 18/00; G12B 13/00
(52) U.S. Cl. .................................................. 250/252.1
(58) Field of Search ........................... 250/252.1, 201.3

(56) References Cited

U.S. PATENT DOCUMENTS

| 5,245,264 A | 9/1993 | Helgren et al. ......... 318/568.22 |
| 5,619,429 A | * 4/1997 | Aloni et al. .................. 700/279 |
| 6,130,749 A | * 10/2000 | Meeks et al. ................ 356/630 |

* cited by examiner

Primary Examiner—John R. Lee
Assistant Examiner—Paul M. Gurzo
(74) Attorney, Agent, or Firm—Max R. Wood; Ogilvy Renault (57) ABSTRACT

A method of recalibrating to compensate for thermal drift between a micro-imaging system and a sample integrated circuit (IC) under investigation determines a planar drift using a cross-correlation between a reference calibration image and a recalibration image, and further determines a focus drift from a difference between a reference focus setting and a recalibration focus setting. The recalibration is performed on detection of a recalibration trigger event, such as expiry of a recalibration time interval. The recalibration time interval can be adaptively adjusted based on a magnitude of the thermal drift. Tile images captured since a last recalibration are recaptured if the thermal drift is too great for reliable image compensation. The system ensures seamless assembly of tile images into image photo-mosaics and increases image photo mosaic throughput.

31 Claims, 5 Drawing Sheets

METHOD AND SYSTEM FOR RECALIBRATION DURING MICRO-IMAGING TO DETERMINE THERMAL DRIFT

TECHNICAL FIELD

The invention relates to the field of micro imaging and, in particular, to methods of recalibration to compensate for thermal drift between a micro-imaging system and a sample under investigation.

BACKGROUND OF THE INVENTION

Semiconductor integrated circuits (ICs) are reverse-engineered for the purposes of validation and product quality assurance. Typically a large group of high magnification tile images representative of a sample IC are acquired using a high magnification micro-imaging system in between deconstructive steps. Subsequent processing of the tile images includes their assembly into one or more photo-mosaics. Each photo-mosaic is representative of the IC sample, or portion thereof, at a particular deconstructive step.

Representative dimensions that have to be resolved by the micro-imaging system are related to the width of traces, which are connections between components on the ICs. Trace width reduction is a goal sought in the semiconductor manufacturing industry to provide increased integration, increased switching speed, reduction in drive voltages, etc. Today typical trace widths are in the micron and submicron range.

The time required for micro imaging an IC sample at each deconstructive step is typically on the order of hours or days. It is well known in the art of material sciences that all known materials are subject to temperature induced deformation. The degree of deformation is dependent on a particular material's coefficient of thermal expansion. A high magnification optical microscope is commonly used in micro imaging. The microscope typically has an arm supporting high magnification optic elements above the sample IC. It has been observed that the components of the micro-imaging system are subject to temperature induced deformation. It has also been observed that the temperature-induced deformation is time dependent, typically having a linear variation. This phenomenon is commonly referred to as "thermal drift". Thermal drift between the optics and the sample IC during micro imaging can cause misalignment between images acquired at different times. It will be understood by those skilled in the art that an imaging system other than optical, such as a beam instrument as used in a Scanning Electron Microscope (SEM) or Focus Ion Beam (FIB), could also be used.

Considering the size of the arm of the optical microscope and coefficient of thermal expansion of the materials used in manufacturing the arm (such as aluminum), thermal drift can sometimes cause a misalignment in excess of 20 microns cumulative between images. Therefore, thermal drift can be a significant impediment to acquiring high magnification images and assembling the images into photo-mosaics representative of a surface of interest of the IC sample.

Misalignments between the optical system and the IC sample during micro-imaging result in either an excess of overlap between the acquired images, or the formation of inter-image gaps. Having excess overlap leads to waste processing time. Having incomplete mosaics due to inter-image gaps results in an inability to validate the IC design.

One option for reducing thermal drift is to wait for the temperature of the sample IC and imaging apparatus to stabilize, assuming stable temperature conditions. However, suitable conditions are very rare. Another option is to enforce dynamic temperature control during the micro-imaging process. This is an expensive option that is difficult to achieve in practice, at least partly because the image acquisition process itself generates heat because the sample IC is positioned for each image acquisition by an electro-mechanical drive mechanism that generates heat when operated. Other factors related to temperature control are heat capacity and heat conductivity coefficients of materials, which impose limits on how quickly, and at what cost dynamic temperature control can be effected.

There therefore exists a need for methods and apparatus for dynamically recalibrating a micro-imaging system to compensate for thermal drift.

SUMMARY OF THE INVENTION

It is an object of the invention to provide a method of determining thermal drift between a micro-imaging system and a sample to compensate for temperature-induced deformation.

It is another object of the invention to ensure compensation for misalignment between a micro-imaging system and an imaged sample based on measured thermal drifts determined during a photo-mosaic acquisition period.

It is a further object of the invention to provide a method of determining thermal drift between the micro-imaging system and the sample at predetermined time intervals during a photo-mosaic acquisition period.

It is a further object of the invention to provide a method of determining thermal drift between the micro-imaging system and the sample based on an adaptive recalibration time interval responsive to a rate of thermal drift.

In accordance to one aspect of the invention a method is provided for determining a measure of thermal drift between the micro-imaging system and a sample. The method includes an initial calibration step performed prior to an acquisition of a series of high magnification images of a surface of interest of the sample. The initial calibration includes positioning a pre-selected calibration location on the sample in a field-of-view of the micro-imaging system, determining a reference calibration focus setting by focusing the micro-imaging system on the sample at the pre-selected calibration location and capturing a reference calibration image. The recalibration is triggered during the acquisition of the images to determine the thermal drift. The thermal drift determination includes repositioning the pre-selected calibration location in the field-of-view of the micro-imaging system, determining a recalibration focus setting, capturing a recalibration image, determining a planar shift from a correlation between the reference calibration image and the recalibration image. The determined planar shift and a difference between the reference calibration focus setting and the recalibration focus setting represent the measure of thermal drift between the micro-imaging system and the sample.

A method is provided for acquiring high magnification tile images of an integrated circuit sample using an optical system subject to thermal drifts. A field of view of a high magnification power optical system is positioned over a surface of the sample at a predetermined location. A tile image of the surface is captured and stored. On detecting a trigger event, a thermal drift between the optical system and the sample is determined with respect to a predetermined calibration location on the surface of the sample. The acquisition of tile images is continued in accordance with predefined rules respecting a degree of thermal drift. The rules include aborting tile image acquisition in the event of excessive thermal drift, recapturing all tile images since a last recalibration in the case of a large thermal drift, and otherwise continuing tile image acquisition.

In accordance with another aspect of the invention the trigger event includes the expiration of a recalibration time interval and the recalibration time interval is adaptively varied based on rules respecting the degree of the thermal drift. As such the recalibration time interval is increased when thermal drift is slight and decreased when thermal drift is significant. Other rules ensure that recalibrations are performed during the tile image acquisition period, and that recalibrations occupy only a certain amount of processing time.

The invention also provides a micro-imaging system for acquiring high magnification tile images of a sample while the system is subject to thermal drift, the tile images being used to construct a seamless photo-mosaic of a surface of interest of the sample. The micro-imaging system comprises means for positioning the surface of interest in a field of view of a micro-imaging system at a location on the sample; means for storing a position of the location; means for focusing the field of view of the micro-imaging system on the surface of interest; means for capturing an image of the surface of interest; means for storing the captured image; means for detecting a trigger event for determining a thermal drift between the micro-imaging-system and the sample; means for determining a thermal drift between the micro-imaging system and the sample in response to the triggering event; and means for controlling the micro-imaging system in accordance with predefined rules respecting the capture of the tile images, the rules being related to an extent of the thermal drift since a last trigger event.

The means for positioning the surface of interest in a field of view of a micro-imaging system at a location on the sample comprises a stage of the micro-imaging system. Algorithms that are executed by a computer workstation control the stage.

The means for determining the thermal drift comprises an algorithm for capturing and storing an in-focus calibration image of a predetermined calibration location on the surface of interest and a focus setting used to capture the calibration image. An algorithm that controls the micro-imaging system returns the system to the calibration location on detection of the trigger event and captures and stores an in-focus recalibration image of the predetermined calibration location on the surface of interest and a focus setting used to capture the in-focus recalibration image.

The means for determining the thermal drift further comprises an algorithm for cross-correlating the calibration image and the recalibration image to determine a planar shift of the micro-imaging system with respect to the surface of interest, and for computing a difference between the calibration and the recalibration focus settings. The algorithm for cross-correlating the calibration image uses a Fourier transform of the calibration image and a Fourier transform of the recalibration image to determine a planar shift along the surface of interest of the recalibration image with respect to the calibration image.

The means for interpreting the predefined rules comprises an algorithm for comparing the extent of the thermal drift to at least one threshold to determine a next action dependent on the extent of the thermal drift with respect to the at least one threshold.

A re-settable clock counter is preferably used for tracking the recalibration interval. The algorithm preferably doubles the recalibration interval if the extent of the thermal drift is less than a recalibration-doubling threshold. The algorithm preferably halves the recalibration interval if the extent of the thermal drift exceeds a recalibration-halving threshold. The algorithm preferably does not change the recalibration interval if the extent of the thermal drift is greater than the doubling threshold but less than the halving threshold. The algorithm preferably controls the micro-imaging system to backtrack to a location on the surface of interest to recapture the images taken since a last recalibration if the extent of the thermal drift exceeds a recapture threshold, and the algorithm preferably abandons image capture if the extent of the thermal drift exceeds an abort threshold. In addition, if the recalibration interval is doubled, the algorithm preferably compares the doubled recalibration interval with a predetermined maximum recalibration interval and sets the recalibration interval to the predetermined maximum recalibration interval if the doubled recalibration interval exceeds the predetermined maximum recalibration interval. If the recalibration interval is halved, the algorithm preferably compares the halved recalibration interval with a predetermined minimum recalibration interval and sets the recalibration interval to the predetermined minimum recalibration interval, if the halved recalibration interval is less than the predetermined maximum recalibration interval.

The focusing algorithm preferably performs a coarse focus search by capturing a series of images at a plurality of coarse focus settings and selecting a best coarse focus setting based on a derived focus measure for each captured image until a peak coarse focus measure is located. The focusing algorithm then performs a fine focus search centered around the peak coarse focus setting by capturing a series of images at fine focus settings and selecting a best fine focus setting based on a derived focus measure for each captured image in the fine focus search.

The advantages include an automated image capture system that enables seamless assembly of tile images into photo-mosaics, and an improved throughput of tile image mosaics.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
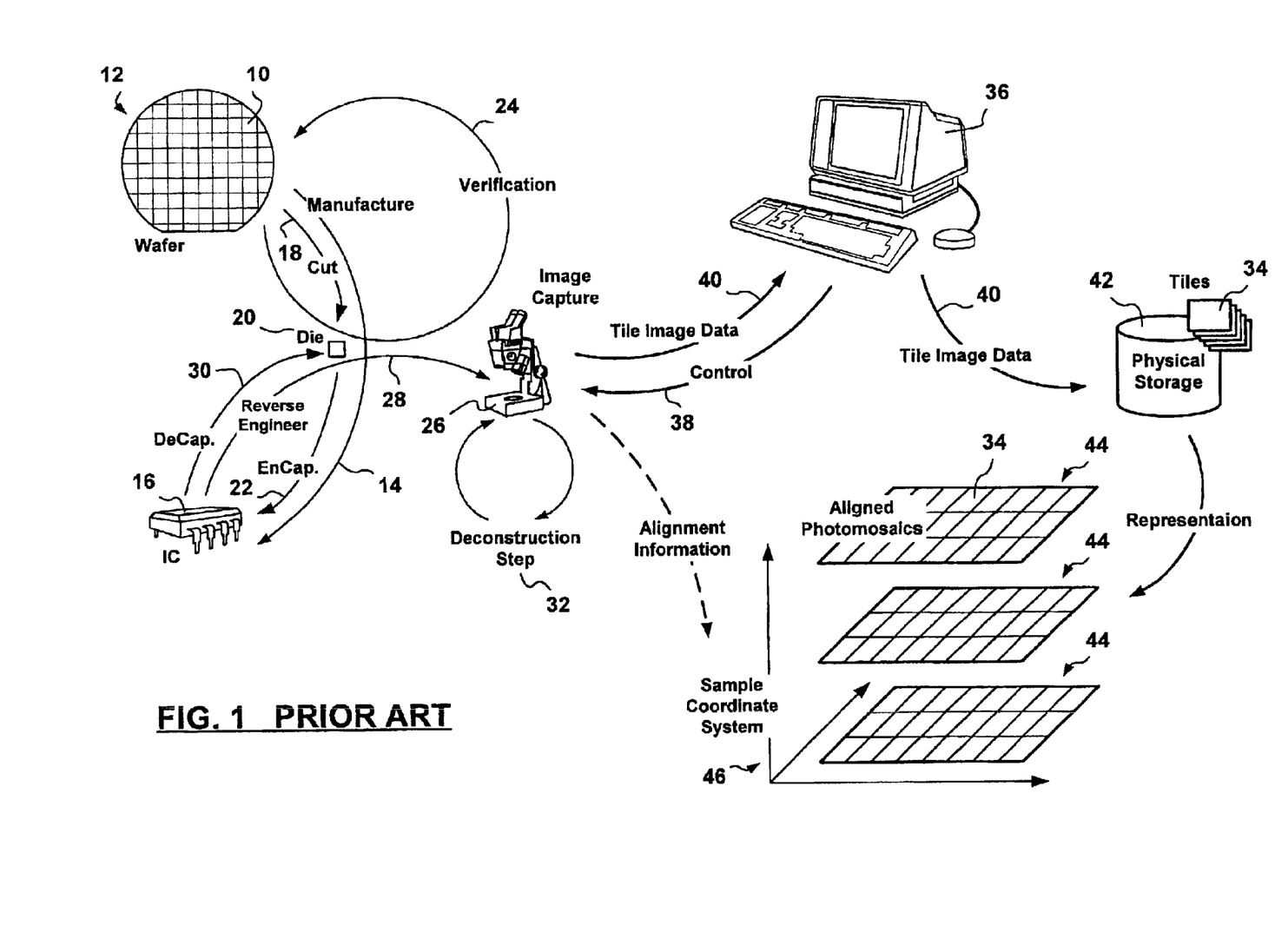
FIG. 1 is a work flow diagram showing an overview of an exemplary process by which photo-mosaics representative of steps in a deconstruction of a semiconductor integrated circuit (IC) are acquired.

FIG. 1 is a work-flow diagram showing an overview of an exemplary prior art process by which photo-mosaics representative of steps in the deconstruction of a semi-conductor integrated circuit (IC) are acquired. ICs 10 are fabricated on a wafer 12. The wafer comprises a mono-crystalline silicon substrate, which is naturally an insulator. Doping the silicon with other chemical elements can change the properties of the silicon, including making the silicon a semi-conductor or a conductor. Such substrate processing is performed as part of a manufacturing process 14 of integrated circuits 16. In packaging an IC 16, a die 20 is cut in a step 18 from the wafer 12 and is encapsulated in step 22 to form a chip.

The manufacture of integrated circuits typically involves a verification process 24 by which wafers 12 or cut dies 20 are inspected using a micro-imaging system 26 to extract design and layout information for design validation of ICs 10.

For the purposes of product quality assurance, or to reconstruct electric circuits for competitive analysis, for example, a process of reverse-engineering 28 is performed on the integrated circuit 16. A first step in the reverse-engineering process 28 is decapsulation 30 of the IC 16 to remove the die 20. Die 20 is inspected using a micro-imaging system 26 to extract design and layout information. The micro-imaging system 26 may include high magnification optical microscopes, scanning electron microscopes, field emission electron microscopes, or the like. Design and layout extraction from a die 20 involves, as shall be described below with respect to FIG. 3, a process of deconstruction 32 by which layers formed during the manufacturing process 14 are removed.

High magnification tile images 34 of the sample die 20 are acquired between each deconstructive step 32 under the control of a computer workstation 36. The computer workstation 36 controls the micro-imaging system 26 using control signals 38. The computer workstation 36 receives tile image data 40 from the micro-imaging system 26 and saves the tile image data 40 to memory, typically physical storage 42, such as a hard disk.

The stored tile images 34 are assembled into photo-mosaics 44, each photo-mosaic 44 representing a surface, or portion thereof, of the die 20 at a deconstructive step 32. During acquisition of the tile images of the die 20, a sample coordinate space 46 is defined. The sample coordinate space 46 is used to align the photo-mosaics 44.

Figures 2, 3:
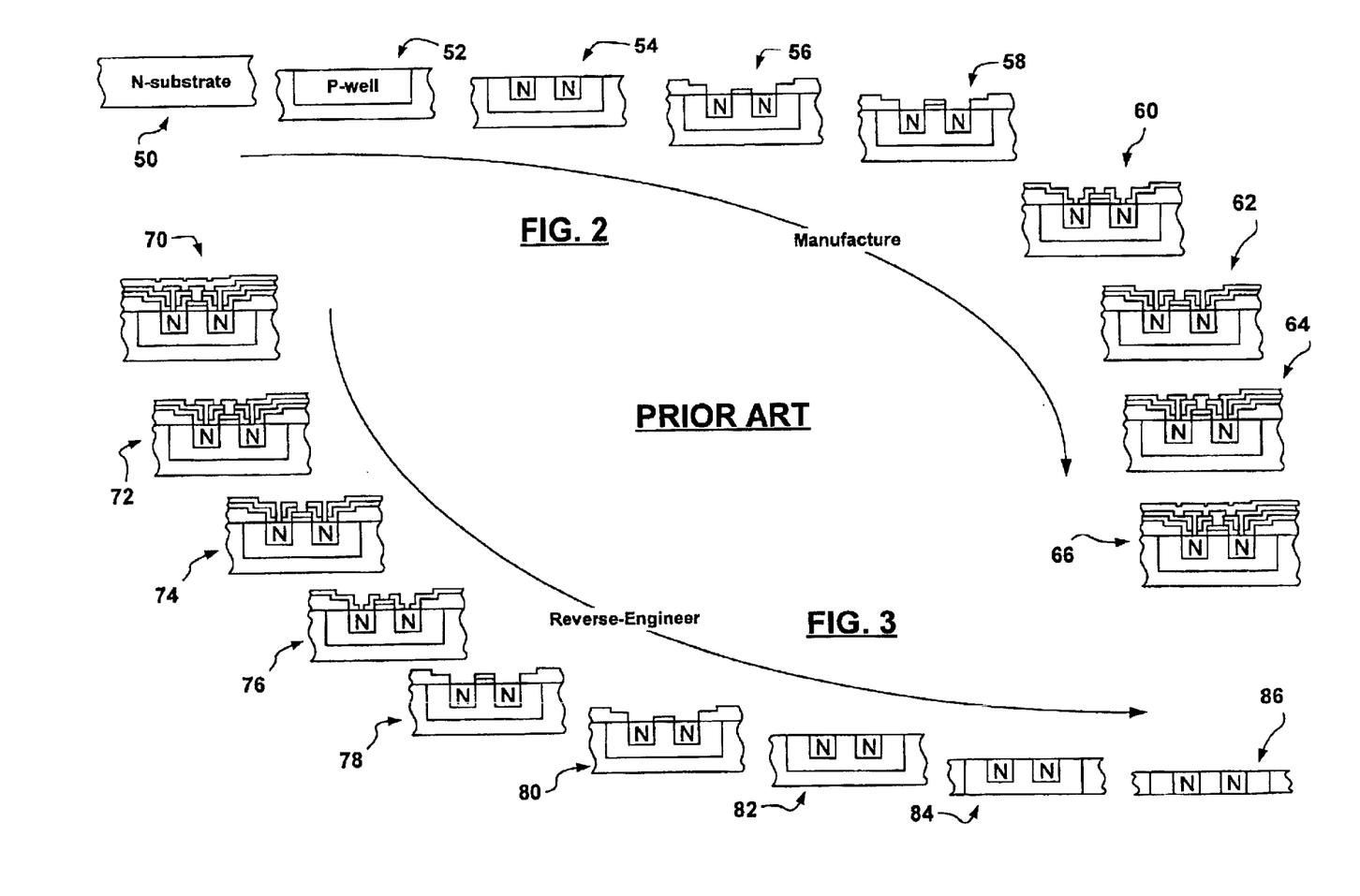
FIG. 2 is a process diagram showing an exemplary progression of steps in manufacturing an IC.
FIG. 3 is a process diagram showing an exemplary progression of steps in deconstructing of an IC for reverse engineering.

FIG. 2 is a process diagram showing an exemplary prior art progression of steps followed during the manufacture of an IC. The diagram shows a progression of cross-sections through a silicon substrate, representing exemplary steps in manufacturing a component such as a junction. In step 52 of the progression, the silicon substrate is doped using diffusion and/or ion implantation techniques to change its characteristics and, in particular, to form P-wells, well known in the art. In step 54, another implantation is performed to form n-type sources and drains. A gate oxide layer is deposited between the sources and drains, and a field oxide is deposited in other areas of the chip in step 56. A polysilicon gate layer is deposited in step 58, and in steps 60 and 62 the deposition of oxide layers is effected. Metal layers for providing connectivity between the gates, sources and drains are deposited in step 64. Step 66 illustrates the deposition of a passivation layer, typically used to protect the IC from physical damage and/or contamination with dust particles before it is encapsulated in step 22 (FIG. 1).

FIG. 3 is a process diagram showing an exemplary prior art progression of deconstructive steps used to reverse-engineer a sample IC. Step 70 illustrates a cross-section through a silicon substrate of a die 20 after decapsulation in step 30 (FIG. 1). Steps 72, 74, 76, 78, 80 and 82 illustrates a progressive removal of the deposited material layers, such as the passivation layer, metalization layers, polysilicon layers, base contact layers, the field oxide layer, etc. This results in an exposed silicon substrate (step 82) including the well structures manufactured during steps 52 and 54 (FIG. 2). In order to reveal the well structure, the back surface of the die 20 may also be deconstructed. Steps 84 and 86 show the progressive deconstruction of the back surface of the die 20 to expose the P- and N-wells. In extracting design and layout information both surfaces of the die 20 may be micro-imaged, and therefore both represent surfaces of interest.

Figure 4:
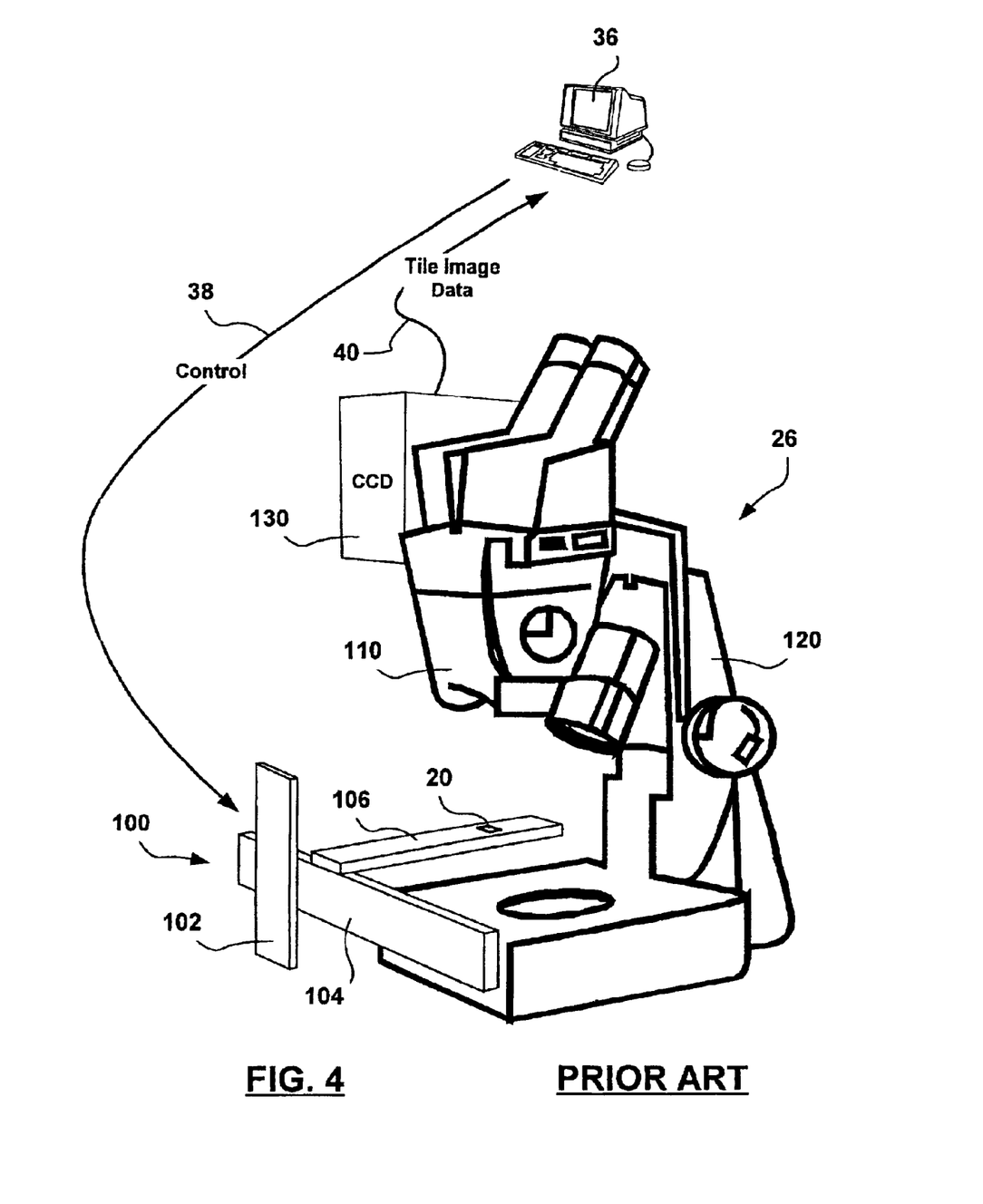
FIG. 4 shows an example of a micro-imaging system comprising a computer controlled optical stage, an imaging system such as a high magnification power microscope and a digital imaging system such as a Charge Coupled Device (CCD) camera.

FIG. 4 shows a prior art example of a micro-imaging system used to acquire tile images of a sample IC. The micro-imaging system 26 typically includes an optical stage schematically illustrated in the diagram at 100. The optical stage 100 provides positioning of the die 20 with respect to the high magnification microscope 110. The optical stage 100 has a vertical axis of displacement 102 and two horizontal axes of displacement 104 and 106. Collectively the axes of displacement 104 and 106 provide motion of the die 20 in a field of view of the microscope 110. Axis of displacement 102 provides positioning of the die 20 in a direction perpendicular to the field of view of the microscope 110 and therefore enables focusing of high magnification optics of the microscope 110 onto a surface of the die 20. The microscope 110 is displaced away from the die 20 by an arm 120. It is known that the components of the microscope 110, including the arm 120 are subject to temperature induced deformation (expansion/contraction) which induces misalignment (thermal drift) between the microscope 110 and the die 20.

Acquisition of tile images 34 is facilitated by a digital imaging system such as a Charge Coupled Device (CCD) camera 130. The optical stage 100 and CCD camera 130 receive control signals 38 from a computer workstation 36 to position the die 20 and move it into focus under the microscope 110. Other control signals 38 effect the capture of tile images 34 (FIG. 1) which are transferred as digital data 40 to the computer workstation 36.

Figure 5:
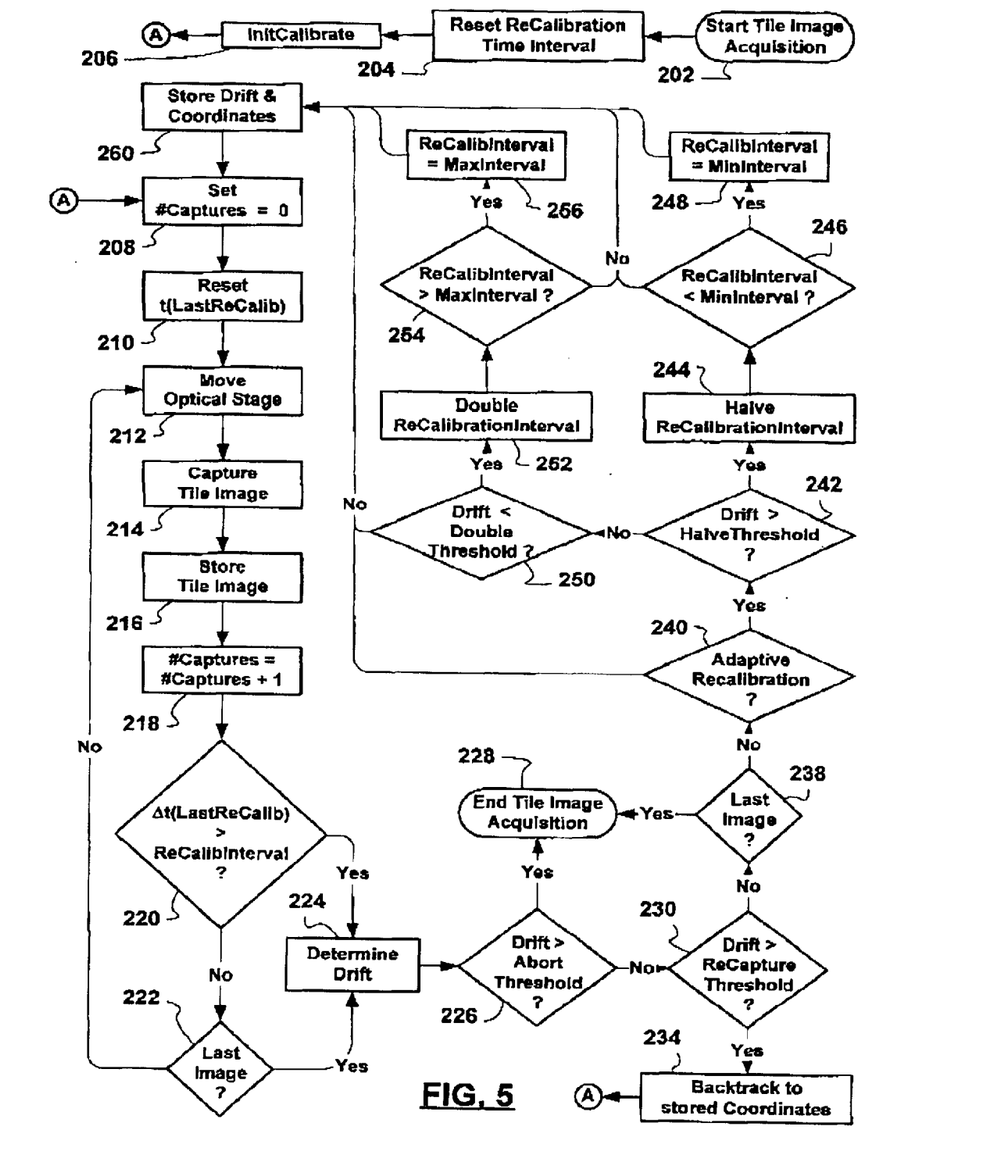
FIG. 5 is a flow diagram showing a process in accordance with the invention by which a micro-imaging system acquires high magnification tile images of an IC sample that is subject to temperature induced deformation.

FIG. 5 is a flow diagram illustrating principal steps in a process in accordance with the invention by which an optical system is adapted to acquire high magnification tile images of an IC sample while subject to thermal drift.

The tile image acquisition process begins in step 202. A recalibration time interval is set to a predetermined default value in step 204. The default time interval typically has a duration required to acquire about 30 tile images. An initial calibration of the optical system 26, and in particular of the position of the microscope 110 with respect to the die 20, is performed in step 206. The initial calibration is described in more detail with reference to FIG. 7.

A tile image acquisition cycle is initiated in step 208 in which a number of tile images captured since a last recalibration is set to zero. A time counter that stores a time since the last recalibration is set to zero in step 210. The optical stage 100 is moved in step 212 to a position in the sample coordinate space where the next tile image 34 (FIG. 1) is to be captured. The tile image 34 is captured in step 214 and the captured tile image data is stored in memory in step 216. The number of tile images captured is then incremented by 1 in step 218. In step 220, the tile image acquisition process checks to determine whether the time elapsed since the time counter was set to zero in step 210 is greater than a current recalibration interval. If the time elapsed is less than the current recalibration interval, the tile image acquisition process checks (step 222) to determine whether the tile image 34 just captured in step 214 is the last tile image of a photo-mosaic. If not, the process continues at step 212 by moving the optical stage 100 (FIG. 4) to a position to capture the next tile image 34.

If it is determined in step 220 that the time elapsed is greater than the current recalibration interval, or if it is determined in step 222 that the tile image captured in step 214 is the last tile image of the photo-mosaic 34, a determination of thermal drift is performed in step 224. The determination of thermal drift will be described below with reference to FIG. 8.

Having determined the thermal drift in step 224, a decision is made in step 226 as to whether the thermal drift is greater than a tile image acquisition abort threshold. If the thermal drift is greater than the tile image acquisition abort threshold, the acquisition of tile images 34 is aborted in step 228. If the thermal drift is determined to be lower than the tile image acquisition abort threshold in step 226, a further decision is made in step 230 as to whether the thermal drift is greater than a tile image recapture threshold. If the thermal drift exceeds the tile image recapture threshold, in step 234 the tile image acquisition process is backtracked to a tile image position stored in step 260 and the image acquisition process resumes at step 208 to recapture all of tile images 34 captured from the position stored in step 260.

If the last captured tile image 34 (FIG. 1) is determined in step 238 to be the last tile image in the photo-mosaic, tile image acquisition is ended in step 228.

In accordance with the invention, the recalibration time schedule may be static or adaptive. A soft toggle is preferably used to activate or deactivate adaptive recalibration. In step 240 it is determined whether adaptive recalibration is activated or deactivated. If adaptive recalibration is deactivated, the tile image acquisition process continues by storing the thermal drift information in step 260 for use in assembling the photo-mosaic as will be explained below in more detail. The position of the last tile image (step 214) that was acquired prior to the determination (in step 224) of the thermal drift is also stored in step 208 in case the system must be backtracked to the stored coordinates in step 234.

If it is determined in step 240 that adaptive recalibration is activated, adaptive adjustment of the recalibration time interval is initiated in step 242. A decision is made in step 242 whether the thermal drift determined in step 224 is greater than a threshold for halving the recalibration time interval. If the thermal drift is greater than the threshold for halving the recalibration time interval, the recalibration time interval is reduced to half of its current duration in step 244.

A check is then made in step 246 to ensure that the recalibration time interval is not lower than a minimum recalibration time interval. The minimum recalibration time interval is set high enough to ensure that the micro-imaging system 26 does not spend an excessive amount of time recalibrating. On the other hand, the minimum recalibration time interval is set low enough to ensure frequent recalibration during periods of high thermal drift. If in step 248 the halved recalibration time interval is found to be lower than the minimum recalibration time interval, the recalibration time interval is set to the minimum recalibration time interval. The image acquisition process continues with storing the thermal drift in memory for later use in resembling the photo-mosaic (step 260), as will be explained below in more detail, and storing the coordinates of the last tile image captured in step 214.

If the temperature drift is determined to be lower than the threshold for halving the recalibration time interval in step 242, the adaptive recalibration algorithm checks in step 250 whether the thermal drift determined in step 224 is lower than a threshold for doubling the recalibration time interval. If the thermal drift is lower than the threshold for doubling the recalibration time interval, the current duration of the recalibration time interval is doubled in step 252. A comparison is made in step 254 to determine whether the recalibration time interval is greater than a maximum recalibration time interval. The maximum recalibration time interval is set to ensure that recalibrations are performed during the acquisition of tile images, even if thermal drift is minimal. If the doubled recalibration time interval is greater than the maximum recalibration time interval, the recalibration time interval is set to the maximum recalibration time interval in step 256.

If it is determined that the thermal drift is not lower than the threshold for doubling the recalibration time interval in step 250, and if the thermal drift is not higher than the threshold for halving the recalibration time interval in step 242, then the process resumes at step 260.

In step 260, the thermal drift and new focus setting are stored in memory, along with the recalibration time, so that the thermal drift (x, y coordinate shift) can be used to assemble the captured tile images 34 (FIG. 1) into a seamless photo-mosaic 44. In assembling the photo-mosaic using the thermal drift information stored in step 260, it is assumed that the thermal drift varied linearly during acquisition of tile images 34 captured between recalibrations. The coordinates of the last tile image captured in step 214 is also recorded in step 240, as explained above. The tile image acquisition process then resumes at step 208.

Figures 6, 7:
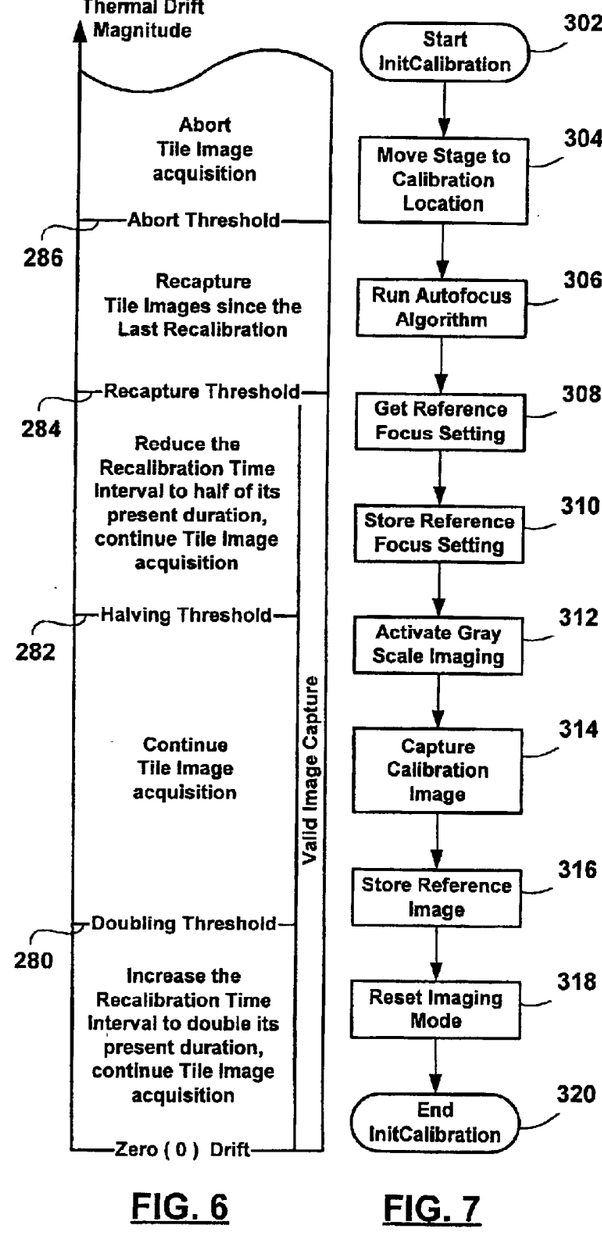
FIG. 6 is an action diagram showing a response of an adaptive recalibration algorithm performed by the micro-imaging system in accordance with the invention to optimize the duration of a recalibration time interval.
FIG. 7 is a flow diagram showing the process in accordance with the invention by which an initial calibration of the micro-imaging system is achieved.

FIG. 6 is an action diagram illustrating the predefined rules governing the actions of the adaptive recalibration process. It can be seen in the action diagram that as the magnitude of the thermal drift increases the value of the tile images captured decreases. Likewise, as the magnitude of the thermal drift increases, the more frequently recalibration is required to ensure that useable images are captured.

If the magnitude of the thermal drift is less than the doubling threshold 280, the images captured are valid and the recalibration time interval is doubled, but is not permitted to exceed a predefined maximum, as explained above. If the magnitude of thermal drift is greater than the doubling threshold 280 but less than the halving threshold 282, the recalibration time interval is left unchanged. If the magnitude of the thermal drift exceeds the halving threshold 282 but is less than the recapture threshold 282, the recalibration time interval is halved, but is not permitted to become shorter than a predetermined minimum, as explained above. If the magnitude of the thermal drift is greater than the recapture threshold but less than the abort threshold, the tile images 34 (FIG. 1) captured since the last recalibration are recaptured. If the magnitude of the thermal drift exceeds the abort threshold 286, all tile images 34 captured for the mosaic 44 are discarded, a new recalibration point is acquired and the process is restarted from an initial calibration process, which is explained below with reference to FIG. 7.

The preferred embodiment of the invention described above uses elapsed time as a recalibration trigger. The initial recalibration time interval corresponds to a time interval required to capture about 30 tile images. Persons skilled in the art will understand that a recalibration trigger can be based on the number of tile images acquired since a last recalibration, rather than an elapsed time interval. Also, the use of adaptive recalibration can optimize the number of tile images captured between recalibrations.

FIG. 7 is a flow diagram showing a process by which an initial calibration of the optical system is achieved. An initial calibration is performed each time a photo-mosaic image capture is begun. The initial calibration of the optical system begins in step 302. The optical stage 100 (FIG. 4) is moved to a pre-selected calibration location in step 304. The pre-selected location is a point on the surface of interest with good structural definition. The pre-selected location is chosen such that no repetitive features in the layout of the location are present in the field of view of the micro-imaging system. Repetitive features self-correlate when the thermal drift causes displacement of the image capture system with respect to the sample die 20 (FIG. 1) a distance that is approximate any multiple of a spacing between the repetitive features. An auto-focus algorithm, described below, is run in step 306 in order to extract a reference focus setting at the pre-selected calibration location in step 308. The reference focus setting is stored in memory, preferably permanent storage, in step 310. Grey scale imaging is activated in step 312. A gray scale image is required for thermal drift determination, which is explained below in more detail. A reference calibration image of the pre-selected calibration location is captured in step 314. The captured image is stored in memory, preferably permanent storage, in step 316, and the imaging mode is reset in step 318. The initial calibration process ends in step 320.

Figure 8:
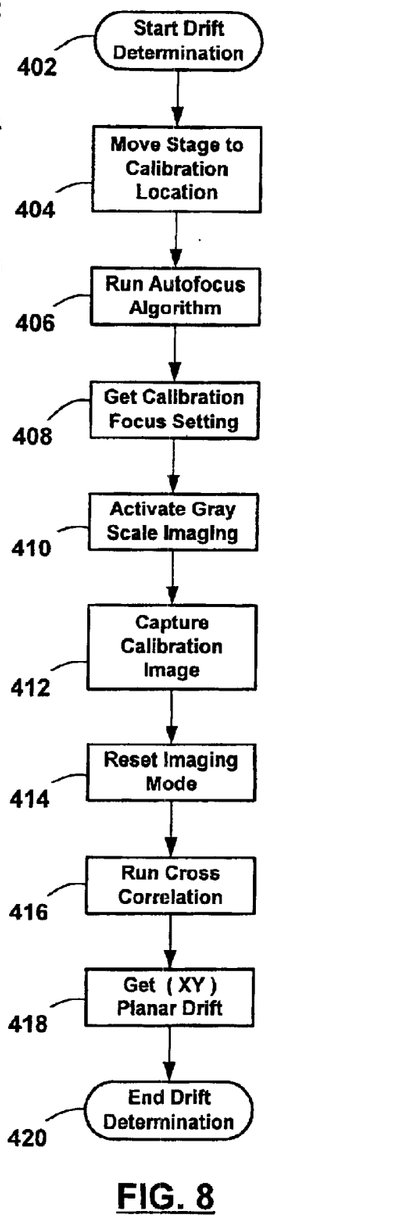
FIG. 8 is a flow diagram showing the process in accordance with the invention by which thermal drift between the micro-imaging system and the sample IC is determined.

FIG. 8 is a flow diagram showing a process in accordance with the invention by which thermal drift of the image capture system with respect to the sample die 20 is determined. The determination of the thermal drift starts at step 402 by moving the optical stage 100 (FIG. 4) to the pre-selected calibration location in step 404. The pre-selected calibration location is the same one used in step 306 (FIG. 7). An auto-focus algorithm is run in step 406 to obtain a recalibration focus setting in step 408. Grey scale imaging is activated in step 410. A recalibration image is captured in step 412, and the imaging mode is reset in step 414. In step 416, a process of cross-correlation is performed between the recalibration image captured in step 412 and the reference calibration image captured in step 314 (FIG. 7). The cross-correlation is preferably performed using a Fourier transform, as will be explained below in more detail. The cross-correlation process determines the thermal drift in step 418. The thermal drift determination process ends in step 420.

In capturing images at high magnification, a depth of field of the captured image is very thin. The thin depth of field enables accurate focusing and therefore focus drift determination. Focus drift determination is based on a difference between the reference focus setting and the recalibration focus setting.

In accordance with a preferred embodiment of the invention, a focus setting determination is achieved by selecting the focus setting used in capturing a best focus image from a series of images captured at monotonically varying focus settings. The auto-focus algorithm positions the sample die 20 (FIG. 1) by moving the optical stage 100 along the vertical axis 102 (FIG. 3) at focus settings below and above a current focus setting. A coarse focus search is first performed by moving the optical stage 100 in coarse increments. The optical stage 100 is then moved in fine increments for a fine focus search. Images in the series are captured at each focus increment. A focus measure is derived from each image in the series. Preferably, the focus measure is an image sharpness measure, but other focus measures can also be used. Various algorithms for calculating the sharpness of an image are known to persons skilled in the art. The auto-focus algorithm uses the focus measure to select the best focused of the images in the series. The variation in the focus measure may be monotonically varying or peaked.

If the variation in the focus measure is monotonic then the best focus setting corresponds to the focus setting of the image having the highest focus measure. However, the auto-focus algorithm is preferably rerun in a search from the highest focus measure to determine if a peak focus measure can be located. If the variation in the focus measure is peaked, then the focus image capture continues, preferably in fine increments centered around the highest focus measure in the peak to find an image having the highest focus measure located during the focus search. In accordance with the preferred embodiment of the invention, focus searching is performed using coarse and fine increments. However, other autofocusing algorithms may be used.

The cross-correlation step 416 (FIG. 8) described above can be performed by correlating the recalibration image to the reference calibration image. In general terms thermal drift determination involves determining planar shifts between the recalibration image and the reference calibration image. According to the preferred embodiment of the invention, the recalibration image and the reference calibration image are transformed using a Fourier transform, well known in the art. The Fourier transform of the reference calibration image and the Fourier transform of the recalibration image are cross-correlated. The cross-correlation of Fourier transforms of images is known in the art of image processing. Other methods for determining a planar shift between two images of the same structure are also known in the art, and the invention is not limited to using Fourier transforms for cross-correlation of the images.

The embodiments of the invention described above are intended to be exemplary only. The scope of the invention is therefore intended to be limited solely by the scope of the appended claims.

I claim:

1. A method of recalibrating a micro-imaging system during acquisition of a plurality of high magnification images of a surface of interest to determine thermal drift, the method comprising steps of:

a) positioning a field-of-view of the micro-imaging system over a pre-selected calibration location on the surface of interest;

b) focusing the micro-imaging system on the surface of interest at the pre-selected calibration location to determine a reference calibration focus setting;

c) capturing a reference calibration image;
d) on detection of a trigger event, repositioning the field-of-view of the micro-imaging system over the pre-selected calibration location;
e) refocusing the micro-imaging system on the pre-selected calibration location to determine a recalibration focus setting;
f) capturing a recalibration image; and
g) determining the thermal drift by performing a correlation between the reference calibration image and the recalibration image and computing a difference between the calibration focus setting and the recalibration focus setting.

2. A method as claimed in claim 1 wherein the thermal drift is stored and used to compensate for misalignments between the images.

3. A method as claimed in claim 1, wherein the step of repositioning the field-of-view of the micro-imaging system over the pre-selected calibration location is triggered by an expiration of a recalibration time interval.

4. A method as claimed in claim 3, wherein the recalibration time interval is predetermined.

5. A method as claimed in claim 3, wherein the recalibration time interval is variable.

6. A method as claimed in claim 1, wherein the step of repositioning the field-of-view of the micro-imaging system over the pre-selected calibration location is triggered by capturing a predetermined number of images.

7. A method as claimed in claim 1, wherein the step of repositioning the field-of-view of the micro-imaging system over the pre-selected calibration location is triggered by capturing a last image in the series of images.

8. A method as claimed in claim 7, wherein the step of determining the planar shift further comprises a step of applying a transform to the reference calibration image and the recalibration image prior to correlation.

9. A method as claimed in claim 8, wherein the transform comprises a Fourier transform.

10. A method as claimed in claim 1, wherein the micro-imaging system comprises a digital opto-electronic camera and the step of capturing tile images comprises digital image acquisition.

11. A method as claimed in claim 1, wherein the steps of focusing and refocusing further comprise steps of:
a) performing a coarse focus search by capturing a series of images at a plurality of different focus settings and selecting a best coarse focus setting based on a derived focus measure for each captured image in the coarse focus search; and
b) performing a fine focus search centered around the best coarse focus setting by capturing a series of images at different focus settings and selecting a best fine focus setting based on a derived focus measure for each captured image in the fine focus search.

12. A method as claimed in claim 11, wherein deriving a focus measure from a captured image comprises a step of calculating an image sharpness measure of the captured image.

13. A method as claimed in claim 11, wherein the step of capturing images during the coarse focus search comprises a step of capturing a series of images of the sample at a progression of coarse focusing increments relative to a current focus setting.

14. A method of acquiring high magnification tile images of an integrated circuit (IC) sample using an imaging system, the tile images being used to construct a seamless image mosaic, the method comprising steps of:

a) positioning the imaging system over a surface of interest of the IC sample at a predetermined tile image location,
b) capturing a tile image of the surface of interest;
c) storing the tile image;
d) on detection of a trigger event, determining a thermal drift of the IC using a pre-selected calibration position on the IC sample; and
e) continuing the acquisition of tile images in accordance with predefined rules related to an extent of the thermal drift determined in step d).

15. A method as claimed in claim 14, wherein the trigger event comprises expiration of a predetermined recalibration time interval.

16. A method as claimed in claim 14, wherein the trigger event comprises expiration of a variable recalibration time interval.

17. A method as claimed in claim 16, wherein the recalibration time interval is adaptively varied and the method further comprises a step of doubling the recalibration time interval if the thermal drift is determined to be less than a recalibration time doubling threshold.

18. A method as claimed in claim 17, wherein the method further comprises a step of resetting the recalibration time interval to a predetermined maximum recalibration time interval if the doubled recalibration time interval is greater than the predetermined maximum recalibration time interval, to ensure that recalibrations are preformed during the acquisition of tile images of the sample.

19. A method as claimed in claim 16, wherein the recalibration time interval is adaptively varied and the method further comprises a step of halving the recalibration time interval if the thermal drift is determined to be greater than a recalibration time halving threshold.

20. A method as claimed in claim 19, wherein the method further comprises a step of resetting the recalibration time interval to a minimum recalibration time interval if the halved recalibration time interval is less than a minimum recalibration time interval, to control processing time spent on recalibration.

21. A micro-imaging system for acquiring high magnification tile images of a sample while the system is subject to thermal drift, the tile images being used to construct a seamless photo-mosaic of a surface of interest of the sample, the system comprising:
a) means for positioning the surface of interest in a field of view of a micro-imaging system at a location on the sample;
b) means for storing a position of the location;
c) means for focusing the field of view of the micro-imaging system on the surface of interest;
d) means for capturing an image of the surface of interest;
e) means for storing the captured image;
f) means for detecting a trigger event for determining a thermal drift between the micro-imaging-system and the sample;
g) means for determining a thermal drift between the micro-imaging system and the sample in response to the trigger event; and
h) means for controlling the micro-imaging system in accordance with predefined rules respecting the capture of the tile images, at least part of the rules being related to an extent of the thermal drift since a last trigger event.

22. A micro-imaging system as claimed in claim 21 wherein the means for positioning the surface of interest in a field of view of a micro-imaging system at a location on the sample comprises a stage of the micro-imaging system which is controlled by algorithms that are executed by a computer workstation.

23. A micro-imaging system as claimed in claim 21 wherein the means for determining the thermal drift comprises an algorithm for capturing and storing an in-focus calibration image of a predetermined calibration location on the surface of interest and a focus setting used to capture the calibration image.

24. A micro-imaging system as claimed in claim 23 wherein the means for determining the thermal drift further comprises an algorithm for returning to the calibration location on detection of the trigger event and capturing and storing an in-focus recalibration image of the predetermined calibration location on the surface of interest and a focus setting used to capture the in-focus recalibration image.

25. A micro-imaging system as claimed in claim 24 wherein the means for determining the thermal drift further comprises an algorithm for cross-correlating the calibration image and the recalibration image to determine a planar shift of the micro-imaging system with respect to the sample, and for computing a difference between the calibration focus setting and the recalibration focus setting.

26. A micro-imaging system as claimed in claim 25 wherein the algorithm for cross-correlating the calibration image uses a Fourier transform of the calibration image and a Fourier transform of the recalibration image to determine a planar shift along the surface of interest of the recalibration image with respect to the calibration image.

27. A micro-imaging system as claimed in claim 21 wherein the means for interpreting predefined rules comprises an algorithm for comparing the extent of the thermal drift to at least one threshold to determine a next action dependent on the extent of the thermal drift with respect to the at least one threshold.

28. A micro-imaging system as claimed in claim 27 further comprising a re-settable clock counter for tracking a recalibration interval.

29. A micro-imaging system as claimed in claim 28 wherein the algorithm performs one of the following actions depending on the extent of the thermal drift:
   a) doubles the recalibration interval if the extent of the thermal drift is less than a recalibration doubling threshold;
   b) halves the recalibration interval if the extent of the thermal drift exceeds a recalibration halving threshold;
   c) does not change the recalibration interval if the extent of the thermal drift is greater than the doubling threshold but less than the halving threshold;
   d) controls the micro-imaging system to backtrack to a location on the surface of interest to recapture the images taken since a last recalibration if the extent of the thermal drift exceeds a recapture threshold; and
   e) abandons image capture if the extent of the thermal drift exceeds an abort threshold.

30. A method as claimed in claim 29 wherein the algorithm further performs one of the following actions:
   a) if the recalibration interval is doubled, the algorithm compares the doubled recalibration interval with a predefined maximum recalibration interval and sets the recalibration interval to the predefined maximum recalibration interval if the doubled recalibration interval exceeds the predefined maximum recalibration interval; and
   b) if the recalibration interval is halved, the algorithm compares the halved recalibration interval with a predefined minimum recalibration interval and sets the recalibration interval to the predefined minimum recalibration interval if the halved recalibration interval is less than the predefined maximum recalibration interval.

31. A micro-imaging system as claimed in claim 21 wherein the means for focusing the field of view of the micro-imaging system on the surface of interest comprises a focus algorithm that performs:
   a) a coarse focus search by capturing a series of images at a plurality of coarse focus settings and selecting a best coarse focus setting based on a derived focus measure for each captured image until a peak coarse focus measure is located; and
   b) a fine focus search centered around the peak coarse focus setting by capturing a series of images at fine focus settings and selecting a best fine focus setting based on a derived focus measure for each captured image in the fine focus search.

* * * * *